United States Patent [19]

Davison

[11] Patent Number: 5,076,479

[45] Date of Patent: Dec. 31, 1991

[54] CARGO RACK

[76] Inventor: Phillip G. Davison, 10579 Martinal Cir., Rancho Bernardo, Calif. 92127

[21] Appl. No.: 520,665

[22] Filed: May 8, 1990

[51] Int. Cl.⁵ .............................................. B60R 9/04
[52] U.S. Cl. .................................. 224/324; 211/49.1; 224/325; 224/331
[58] Field of Search ............... 224/309, 318, 321, 322, 224/323, 324, 325, 331, 917, 329, 330; 211/70.4, 49.1

[56] References Cited

U.S. PATENT DOCUMENTS

| | | | |
|---|---|---|---|
| 2,434,387 | 1/1948 | Brandt | 224/329 X |
| 2,731,181 | 1/1956 | Binding | 224/320 |
| 2,757,458 | 11/1957 | Merrill | 33/373 |
| 2,788,929 | 4/1957 | Gallagher | 224/323 |
| 2,789,743 | 4/1957 | Waldman | 224/324 X |
| 2,809,008 | 10/1957 | Halvarson | 224/324 X |
| 2,988,253 | 6/1961 | Menghi | 224/318 |
| 3,128,516 | 4/1964 | Halvarson et al. | 24/680 D |
| 3,257,052 | 6/1966 | McMiller | 224/917 X |
| 3,836,058 | 9/1974 | Penniman et al. | 224/315 |
| 3,899,111 | 8/1975 | Binding et al. | 224/330 |
| 3,902,641 | 9/1975 | Peasley | 224/318 |
| 4,372,470 | 2/1983 | Dallaire | 224/324 |
| 4,618,083 | 10/1986 | Weger, Jr. | 224/324 |
| 4,900,203 | 2/1990 | Pope | 224/318 X |
| 4,961,524 | 10/1990 | Huntz | 224/309 X |

FOREIGN PATENT DOCUMENTS

| | | | |
|---|---|---|---|
| 238054 | 5/1964 | Austria | 224/322 |
| 751080 | 6/1956 | United Kingdom | 224/318 |
| 2053113 | 2/1981 | United Kingdom | 224/322 |

Primary Examiner—Henry J. Recla
Assistant Examiner—Glenn T. Barrett
Attorney, Agent, or Firm—Fulwider, Patton, Lee & Utecht

[57] ABSTRACT

A cargo rack mountable on the roof of a car or the bed of a pickup truck. The rack has a frame that includes a support base for carrying cargo between a pair of spaced apart upstanding members. A restraining strap on the frame extends between the upstanding members. Elastic cords extending from the upstanding members suspend the strap over the support base to provide clearance for the cargo. A ratchet mechanism urges the strap toward the cargo to hold it on the support base.

19 Claims, 4 Drawing Sheets

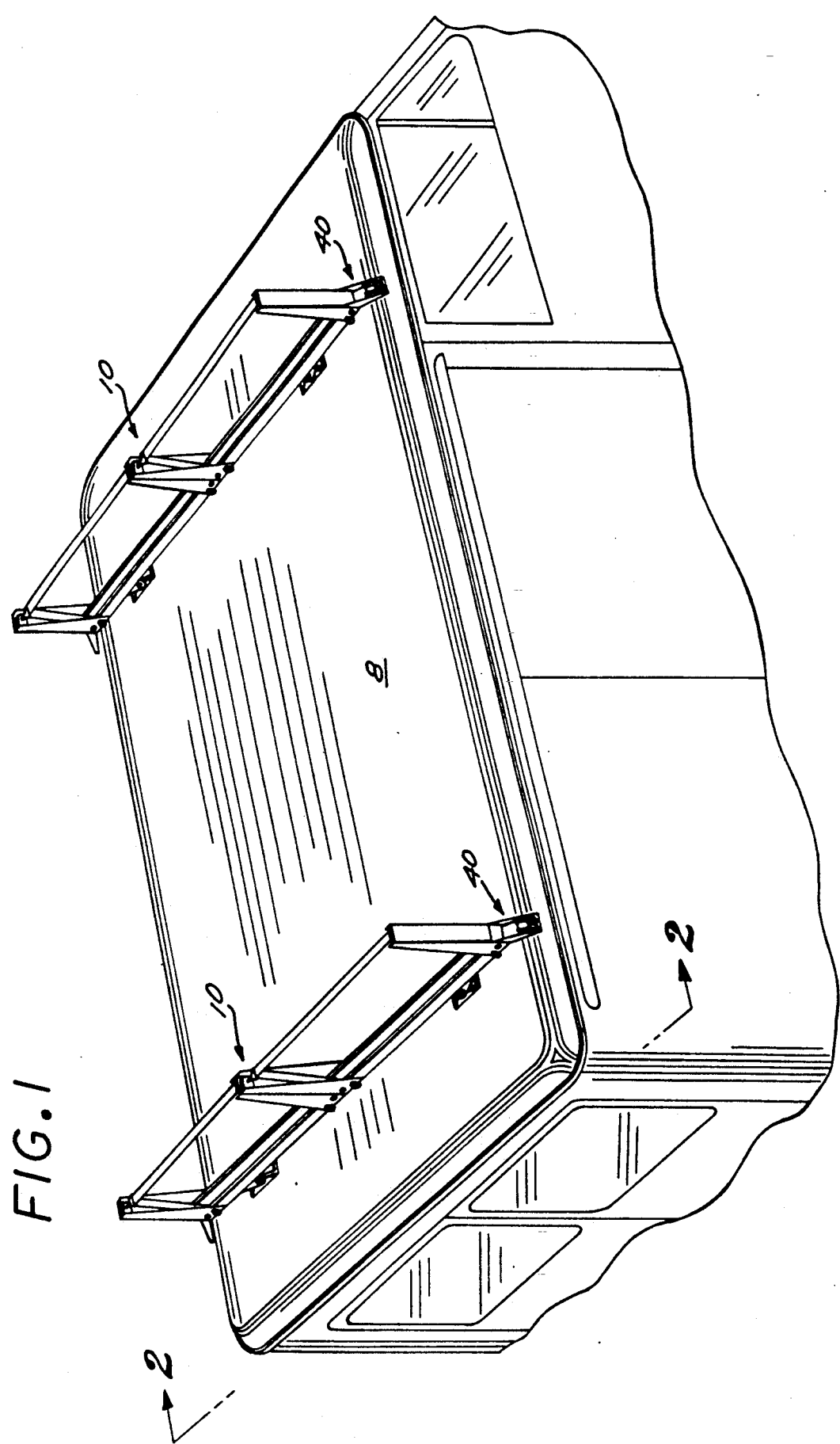

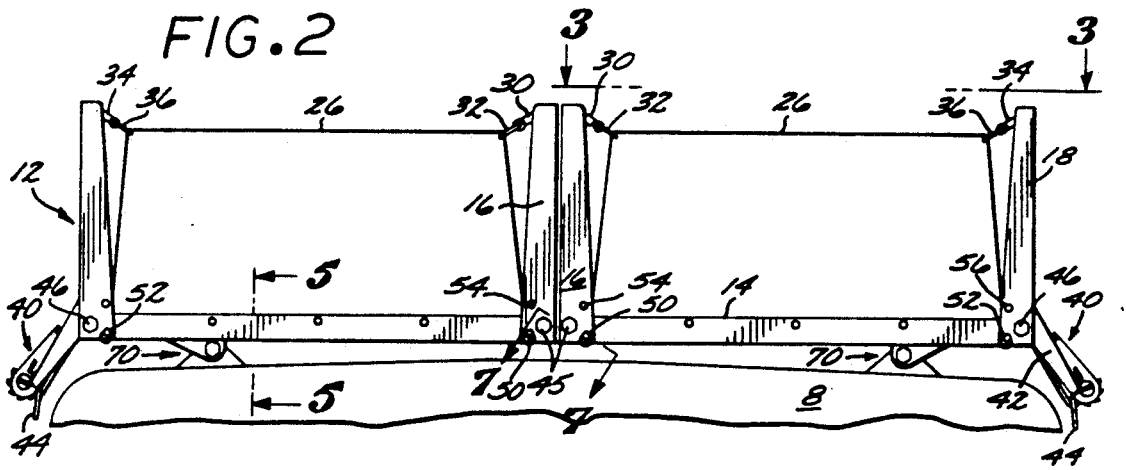
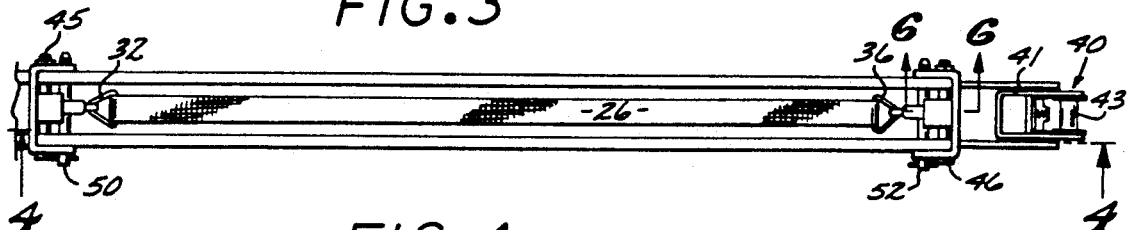
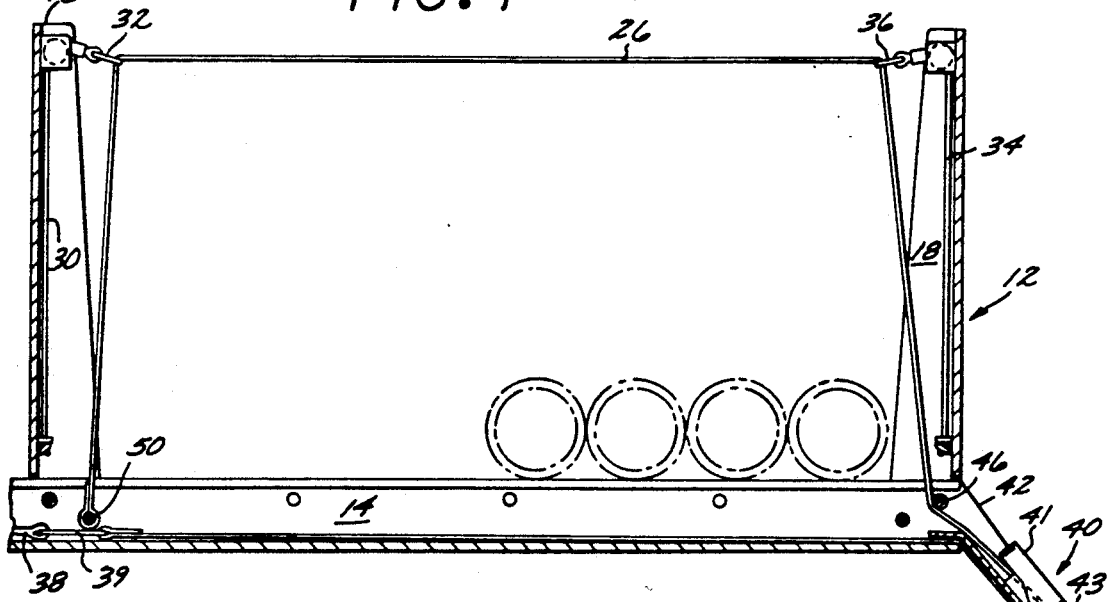
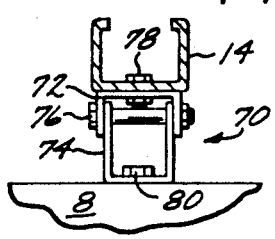
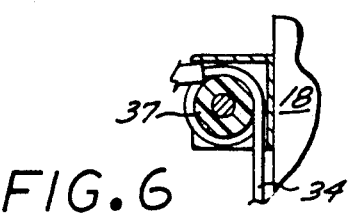

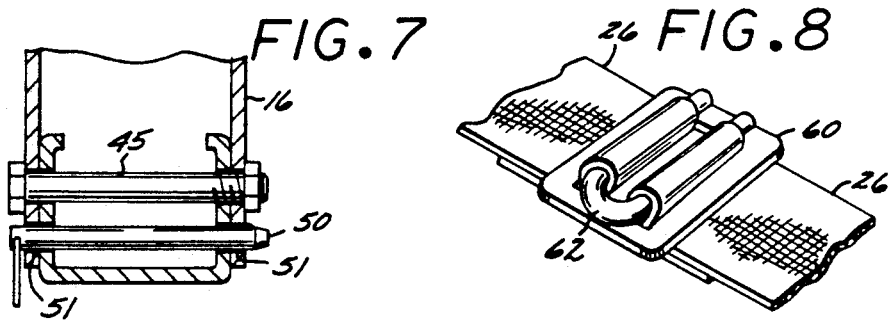
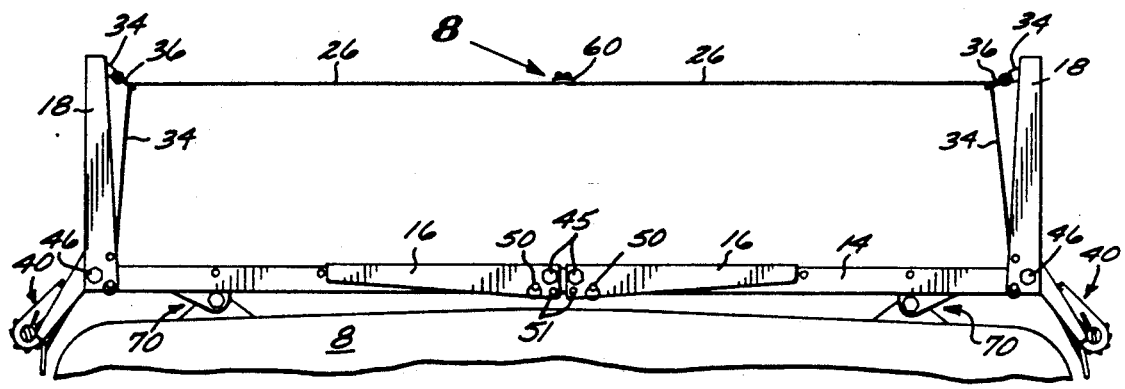
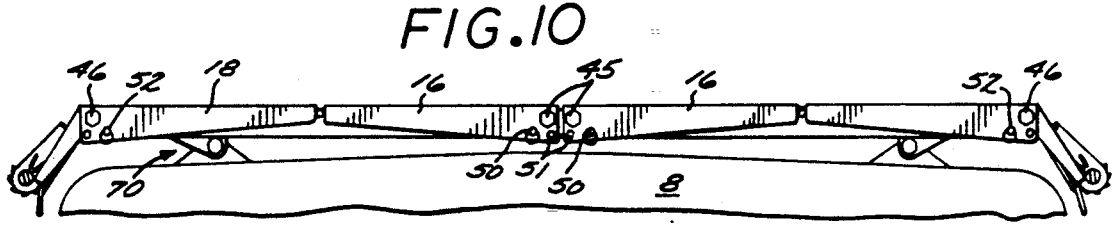
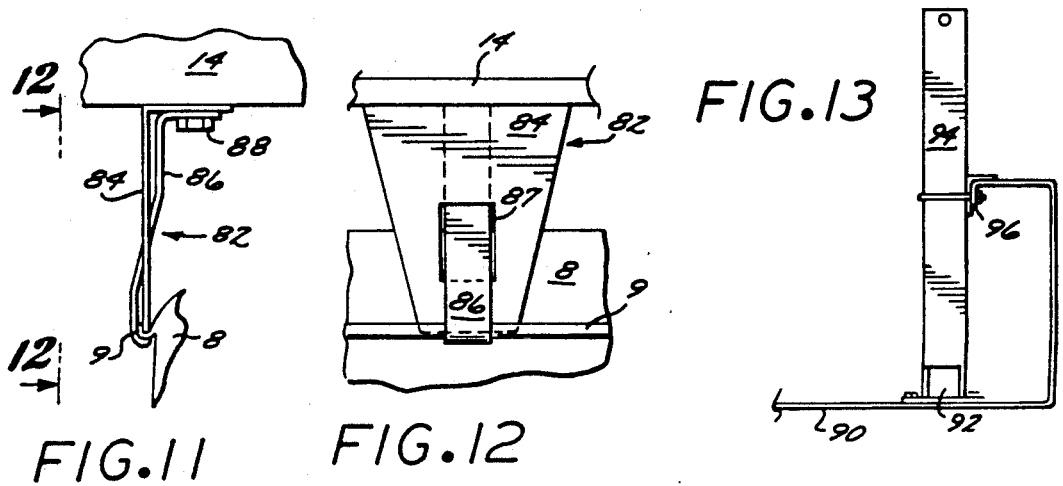

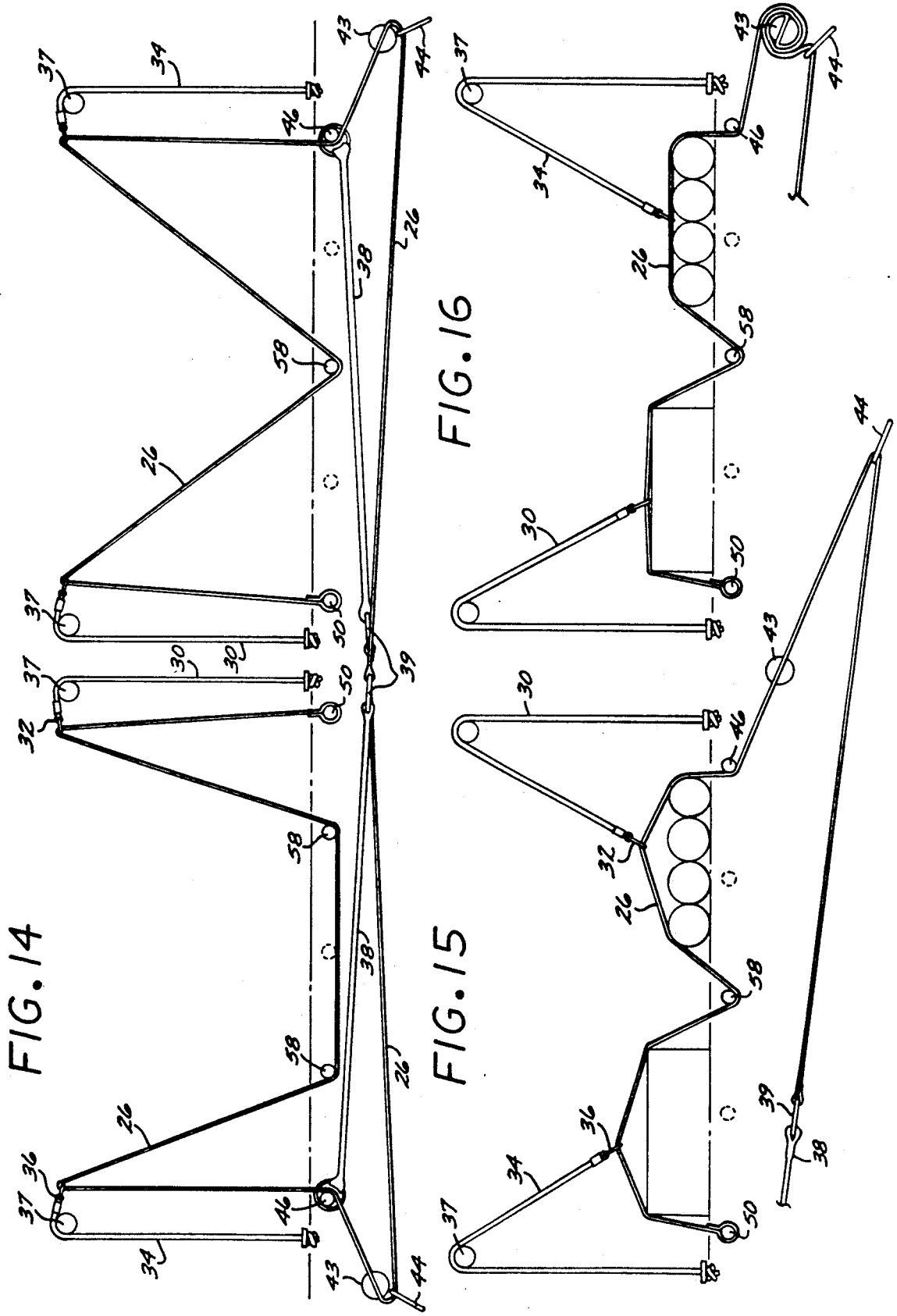

CARGO RACK

This invention relates to structure for supporting and restraining cargoes and more particularly to a cargo rack adapted to be mounted on a motor vehicle.

BACKGROUND

1. Description of the prior art

Great care must be exercised when placing cargoes for transportation outside a motor vehicle. Safety concerns dictate that the cargo be properly supported and securely restrained to prevent movement during transportation.

Many vehicle racks are available for transporting cargoes. Some can be installed on the roof of a vehicle such as a car or a van. Others are mountable in an overhead position above the bed of a pickup truck. Although many are sufficiently sturdy to support the cargo, they have many deficiencies and drawbacks.

For example, many cargo racks characterized by a frame structure do not have integral provisions for restraining a cargo. The user has to provide ropes or straps to secure the cargo on the rack. Ropes and straps are easily lost, and their lack of integration with the cargo rack slows cargo handling. More particularly, after the cargo is positioned on the rack, the rope must be attached to the frame structure on one side of the cargo, passed over the cargo to the other side, and then attached to the opposite side of the frame. In the process, the user usually has to move from one side of the vehicle to the other several times while manipulating the rope and maintaining it in tension. This process is even more inconvenient and cumbersome when separate cargoes of different sizes and shapes are to be secured on the rack.

Also, in some rack systems rigid upstanding posts are provided to laterally support the cargo. These are not aesthetically pleasing and their height may prevent entry to many building structures.

Accordingly, what is needed is a cargo rack which can provide appropriate cargo support and restraint in an efficient manner. The rack must be capable of accommodating cargoes of different weights, sizes and shapes, and should be easily accessible to a user. Also, the cargo rack should have a low profile to satisfy vertical clearances of typical commercial and residential building entrances.

SUMMARY OF INVENTION

According to the present invention, a cargo rack is provided that is adapted to be mounted upon a vehicle above the roof or truck bed. The rack comprises a frame which includes a cargo support base and a pair of upstanding posts mounted to the base, and which together define a cargo or payload bay. A restraining strap is secured to the frame and has a portion extending between the posts. The strap is suspended over the base by suspension means in the form of a pair of elastic cords extending from the upstanding posts. A ratchet mechanism mounted on the frame engages the strap and urges it toward the support base, tightening it onto the cargo.

In one embodiment, the support base is elongated and has a channel shape cross section. The support base can accept one or more pins for engaging the strap with the base to divide the payload bay into two or more sections for receiving separate cargoes. Additionally, the base houses any excess length of the strap when the strap is tightened onto the cargo.

The strap tightening ratchet mechanism is mounted adjacent one end of the base at the side of the vehicle so that it is readily accessible for a user to operate from ground level.

The upstanding posts are hingedly mounted on the base and are secured in their upstanding positions by removable pins. The posts can be folded into horizontal or retracted positions to overlie the support base and thereby establish a low profile configuration for clearing entrances to typical commercial and residential buildings. The retracted posts also enable the rack to be compactly stored and handled.

The cargo rack preferably includes a pair of roof mounting brackets which are adapted to accommodate any variations in the vehicle roof. Alternatively, the cargo rack may include a gutter mounting assembly for mounting the cargo rack to the gutters along the sides of the vehicle roof. An extension adapter may also be provided so that the cargo rack can be erected above the bed of a pickup truck.

The rack can be deployed in pairs in a fore-and-aft relationship relative to the vehicle, and extending across the width of the vehicle, to carry elongated cargo such as pipes and ladders.

Other objects and features of the invention will become apparent from consideration of the following description taken in connection with the accompanying drawings.

BRIEF DESCRIPTION OF THE DRAWINGS

FIG. 1 is a perspective view of a pair of the cargo racks of the present invention, illustrating a convenient way of mounting the cargo racks on the roof of a vehicle in a longitudinally spaced apart relationship for carrying elongated cargoes;

FIG. 2 is a rear elevational view of the cargo rack taken from line 2—2 of FIG. 1 and illustrating use of pairs of raised inner and outer posts to define two payload bays;

FIG. 3 is an enlarged partial top plan view taken from line 3—3 of FIG. 2;

FIG. 4 is a cross-sectional view taken from line 4—4 of FIG. 3, and illustrating the formation of one payload bay by an inner and an outer post;

FIG. 5 is an enlarged cross-sectional view taken from line 5—5 of FIG. 2 showing the mounting bracket for the rack;

FIG. 6 is an enlarged cross-sectional view taken from line 6—6 of FIG. 3 showing an elastic cord in engagement with the pulley;

FIG. 7 is an enlarged cross-sectional view taken from line 7—7 of FIG. 2 showing the bolts and pins mounting one of the upstanding posts;

FIG. 8 is an enlarged perspective view showing the connection between free ends of the strap to define a single payload bay;

FIG. 9 is a front elevational view of the cargo rack, illustrating the pair of inner posts in their lowered or retracted positions;

FIG. 10 is a front elevational view of the cargo rack, illustrating all of the inner and outer posts in their lowered or retracted positions;

FIG. 11 is an enlarged front elevational view showing a bracket assembly for mounting the cargo rack to the gutter of the roof of a vehicle;

FIG. 12 is a side view of the bracket assembly taken from line 12—12 of FIG. 11;

FIG. 13 is an enlarged front elevational view of an extension adapter for mounting the cargo rack above the bed of a pickup truck;

FIG. 14 is a diagrammatic view of one arrangement of the strap and strap connections on the cargo rack, and illustrates engagement of the strap with the pins to partition the payload bay into separate payload bay sections;

FIG. 15 is a view similar to FIG. 14, but illustrating another arrangement to accept separate cargoes in adjacent sections of the payload bays, and further illustrating the strap being drawn down onto the cargoes; and FIG. 16 is a view similar to FIG. 15, but illustrating the cargoes held in the payload bay sections under tension developed by the ratchet mechanism.

DETAILED DESCRIPTION

The cargo rack of the present invention is a highly efficient, easily operable apparatus which provides cargo support and restraint for a wide range of cargo shapes and sizes.

As shown in FIGS. 1-4, the cargo rack lo is adapted to be mounted on the outside structure of a vehicle such as the roof 8 of a car or a van. The cargo rack can be conveniently deployed in pairs on the roof 8 in a fore-and-aft, or longitudinally spaced apart relationship on the vehicle for carrying elongated cargoes such as pipes, lumber or ladders.

Each of the cargo racks 10 includes a frame 12 having a support base 14 which extends across the width of the roof 8.

The support base 14 is preferably an elongated channel member, as best seen in FIG. 3, and has opposite end openings. However, the base could take the form of any structure or platform adapted to support the cargo above the vehicle.

The frame 12 further has two pairs of upstanding members or posts 16 and 18 mounted in alignment on support base 14. Each of the pairs of upstanding posts has an inner post 16 and an outer post 18 spaced apart to define a cargo or payload bay. As will be seen, the pair of adjacent payload bays thus defined are adapted to hold separate cargoes. As will also be seen, the two inner posts 16 can be folded into lowered or retracted positions to form a single payload bay extending across the width of the vehicle for holding a wide cargo.

The cargo rack includes a pair of integral straps 26 for the adjacent payload bays. Each strap 26 can be oriented to secure a cargo or cargoes between the inner and outer posts of the payload bay. Each strap has a portion which is initially suspended or held above the support base 14 by suspension means which extends from at least one of the posts.

In the embodiment shown in FIG. 2, the suspension means for each payload bay comprises a pair of cords 30 and 34 which are preferably elastic and mount connectors 32 and 36, respectively. The cords 30 and 34 extend from the upper portions of adjacent posts 16 and 18, respectively, to suspend the associated portions of the strap 26 over the support base. FIG. 6 illustrates this, cord 34 being engaged upon a pulley carrier 37 at the upper end of the post 18. This enables a cargo to be conveniently placed within the payload bay defined beneath each strap portion and eliminates the time consuming and inefficient use of straps or ropes attached to the frame, as is typical of many prior art cargo racks.

The strap 26 for each payload bay is integrally carried by the frame 12 and is operative independently of the other. As best seen in FIG. 4, which illustrates one payload bay and its associated strap, one end of the strap 26 has a loop encircling a pin 50 which is fastened to the frame 12 adjacent an inner post 16 to secure the end of the strap 26 to the frame 12.

Strap 26 extends upwardly toward the upper portion of the inner post 16 and slidably passes through an aperture in the connector 32 of the cord 30. The strap 26 then extends horizontally over the support base 14 toward an outer post 18. There it is similarly slidably disposed through an aperture in the connector 36.

From the connector 36 the strap 26 extends downwardly toward the base of the outer post 18. Near the base of the outer post 18, the strap 26 slidably engages and is redirected by a pin or bolt 46 for passage through the adjacent open end of the base 14.

The strap 26 next passes through a slot in a spindle 43 of tension means or ratchet mechanism 40 which is mounted to a bracket 42 attached to and extending downwardly of the associated end of the base 14. The strap 26 wraps around the spindle and is guided by surfaces of the bracket 42 for reentry into the channel of the support base 14. The portion of the strap extending from the pin 50, through the connectors 32 and 36, through the ratchet mechanism, and back into the hollow interior of the support base 14 is preferably relatively inelastic to firmly hold the cargo in the payload bay upon rotation of the spindle by the ratchet mechanism. However, a portion of the strap is preferably made relatively elastic as a take-up means for excess strap.

More particularly, as best seen in FIG. 14, the end of the inelastic strap portion is connected by a connector 39 to one end of a take-up means in the form of an elastic cord 38. The other end of the cord 38 includes a ring member which passes about and is anchored by a pin 46 carried by the base 14 at its end opposite the ratchet mechanism. A similar arrangement is provided by the strap of the adjacent payload bay. Preferably the pin 46 of each bay serves a dual purpose. It deflects or redirects its associated strap, and it also anchors the end of the strap of the adjacent bay. As will be seen, each pin 46 also has the additional function of providing a pivot axis for its associated post 18.

Each cord 38 stretches under tension to take up slack and maintain each portion of strap 26 within the channel of the base taut. Although the take-up means 38 is illustrated in the form of an elastic cord, any suitable biasing means may be used such as, for example, a spring wound reel or the like (not shown).

The foregoing arrangement thus provides a pair of adjacent payload bays defined between the respective pairs of inner and outer posts 16 and 18. A separate one of the straps 26 overlies each bay, and operation of the associated ratchet mechanism for each will pull the straps down onto the cargoes in the payload bays. The bias of the suspension cords 30 and 34 is sufficient to suspend the straps above the base 14 to facilitate unobstructed loading of the cargoes within the bays, but it is insufficient to prevent the ratchet mechanism from pulling the straps down onto the cargoes. The belt slack generated by the operation of the tension means or ratchet mechanism 40 is automatically taken up by the elastic take-up means or cords 38. In this regard, it will be apparent that in the suspended state of the straps 26, as illustrated in FIG. 2, the cords 38 are relatively highly tensioned. This establishes effective strap take-up when the straps are brought down onto the cargoes.

As will be seen, initially large amounts of slack strap can be taken up prior to operation of the ratchet mechanism by pulling downward and outwardly upon a manual take-up ring 44. The ring 44 is located beyond or below the ratchet mechanism spindle 43 and the strap is slidably disposed through the ring. Loose slack taken up this way with the ring is then taken up by the associated elastic cord 38 upon release of the ring. This provides a tidy and secured storage for the extra length of the strap to prevent it from undesirable entanglement with other external objects. Thereafter, operation of the tension means or ratchet mechanism firmly and forcibly tightens the strap over the cargo.

The location of the ratchet mechanism 40 provides easy access to the user. For a typical car or van, the ratchet mechanism 40 can be reached and actuated by a user located at ground level and at the side of the vehicle.

There are many types of ratchet mechanisms that can be used in the invention. In one embodiment of the invention, the ratchet mechanism 40 is of the type that incorporates a lever 41 that is actuated by repetitive rocking motions. After initial slack is taken out by pulling upon the ring 44, actuation of the lever 41 rotates the spindle 43 to wind the strap 26 around the spindle, and draw the strap down onto the cargo from the position of FIGS. 2 and 4. After the strap 26 is in contact with the cargo, additional lever action develops the tension in the strap 26 necessary to hold the cargo on the cargo rack.

The precise form of tension means or ratchet mechanism is itself not a part of the present invention. Suitable forms of tension means are in wide use by truckers, for example, to tie or hold down cargoes on flat bed trucks and the like. The tension means is operative to enable loose slack to be quickly taken up manually, and thereafter operative to tightly hold down the cargo. Such tension means can also be released to allow the cargo to be unloaded.

Once the tension means or ratchet mechanism 40 is released, the relative bias in the elastic cords 30 and 34, versus that of cords 38, allows the associated strap 26 to rise to the position illustrated in FIG. 4.

The inner posts 16 and outer posts 18 are hingedly mounted to the support base 14 by fastener means such as bolts 45 and 46, respectively, as shown in FIGS. 7, 9 and 10. The upstanding positions of posts 16 and 18 are maintained by pins 50 and 52 inserted through respective post openings 51 which are aligned with corresponding openings on the support base 14. In addition to supporting the suspension means or cords 30 and 34, the posts 16 and 18 provide lateral support to the cargo.

The inner and outer posts 16 and 18 can be folded or pivoted into lowered or retracted horizontal positions to form a single payload bay extending across the width of the vehicle for holding a wide cargo. As seen in FIGS. 2 and 9, this is done by removing pins 50 and 52 from the openings 51. The retracted positions of the posts are maintained by replacing pins 50 and 52 into openings 54 and 56 which are aligned with corresponding openings on the base 14. Both the inner posts 16 and the outer posts 18 are channel shape in cross section. In the retracted positions, the posts 16 and 18 are flush with and straddle the support base 14.

When pins 50 are removed from the frame, the end portions of the straps 26 for the payload bays are detached from the frame 12 and connected with a connector such as a buckle 60. The buckle 60, as seen in FIG. 8, has two slots through which the end loops of the strap 26 extend. These loops are engaged and connected together by a U-bolt 62.

The resulting strap is maintained in suspended position above the single cargo or payload bay by the cords at the outer posts 18 together with the connectors 36, as discussed above. The cargo is then positioned in the payload bay under the strap 26 and upon the base 14 and folded down posts 16.

As seen in FIG. 10, all of the posts can be folded down so that cargoes having a width greater than the distance between the two outer posts 18 can be placed upon the folded inner and outer posts 16 and 18. Then the straps 26 are passed through the end openings of the base 14 and over the cargo. If desired, only a single strap could be used.

Thus, with all the posts in the lowered or retracted positions, the cargo rack establishes a low profile configuration for clearing entrances to typical commercial and residential buildings. Such configuration also enables the rack to be compactly stored and handled.

The cargo rack 10 can be secured on a vehicle by any appropriate mounting means. FIGS. 2 and 5 show a pair of spaced apart bracket assemblies 70 mounting the cargo rack 10 on the roof 8 of the vehicle. Each bracket assembly 70 comprises a base support member 72 and a roof mounting member 74 that are pivotally connected together by bolt 76. The base support member 72 is fastened to the base 14 by bolt 78 through slots (not shown) along the length of the base 14. The slots allow adjustments in positioning the mounting bracket assemblies 70 to avoid undesirable interference with other parts or features of the roof of the vehicle.

The roof mounting member 74 is secured to the roof 8 of the vehicle by fastening means such as a bolt 80. The roof mounting member 74 has a bottom surface in contact with the roof 8 to assure even load distribution. The pivotal connection between the base support member 72 and the roof mounting member 74 allows the latter to rotate so its bottom surface can conform to the surface contour of the roof 8 to prevent uneven stress distribution.

For vehicles having gutters along the sides of the roof, an alternate embodiment of the mounting means is shown in FIGS. 11 and 12. The gutter mounting assembly 82 comprises a vertically oriented base support leg 84 and a retaining leg 86 which extends upwardly through an opening 87 in the leg 84. This centers and captures the leg 86 relative to the leg 84. Each includes a top flange and a lower extremity engaging opposite sides of the gutter 9. The top flanges are urged together and are fastened to the underside of the base 14 by a bolt 88. Upon initial installation there is a clearance between the top flanges. Tightening the bolt 88 closes the clearance and urges the lower extremities of the base support leg and the retaining leg against the opposite sides of the gutter, thereby securely fixing the bracket assembly and cargo rack on the vehicle roof.

FIG. 13 shows an extension adapter for mounting the cargo rack in spaced relation above the bed of a pickup truck. A pair of such adapters are disposed in spaced-apart relationship across the bed of the truck for supporting the cargo rack. Two pairs can be used to support two cargo racks for carrying elongated cargoes. The adapter includes a flat base and an integral, cylindrical anchor 92 mounted on bed 90 of the truck. The adapter also includes a vertical leg 94 which is preferably square in cross section with an opening at the lower end and telescoped over and about the anchor 92 in close fitting relation. The inner dimensions of the leg 94 are such that the inner walls of the leg 94 engage the outer circumferential surface of the anchor 92 at four equally spaced apart locations. This constrains the leg 94 against any rotational and lateral movement. The minimal tangential surface contacts also facilitates insertion and removal of the leg 94 relative to the anchor 92.

As shown in FIG. 13, the leg 94 is also secured to a side wall of the truck body by a suitable means such as a bracket and U-bolt 96. The cargo rack (not shown in FIG. 13) can then be secured to the upper ends of the pair of legs 94 by any suitable means, as will be apparent.

The versatility of the cargo rack is further illustrated in FIGS. 14-16. Partition means in the form of pins 58 can be used to divide each cargo or payload bay into a plurality of smaller payload bay sections. The pins 58 are inserted into the support base 14 for engaging the strap 26 as illustrated. The smaller bay sections thus formed accept different cargoes such as lumber or pipes. Even though the sizes or heights of these cargoes are different, each is securely held in position. Thus, when smaller cargoes are to be transported, the smaller payload bay sections can easily be formed in advance of cargo placement by simply removing or inserting the pins 58 as needed. After the cargoes have been positioned in the payload bay sections, the strap 26 is moved toward the cargoes by pulling the strap 26 with the rig 44, as shown in FIG. 15. After the strap 26 engages the cargoes, the ratchet mechanism is actuated to tighten the strap onto the separate cargoes.

While the description of the invention herein has been directed to a specific embodiment various modifications can be made without departing from the spirit and scope of the invention. Accordingly, it is not intended that the invention be limited except as set forth in the appended claims.

I claim:

1. A cargo rack adapted to be mounted on a vehicle for carrying a cargo, the cargo rack comprising:
a frame having a support base and a pair of spaced apart upstanding members mounted on the support base;
a strap secured to the frame and extending between the upstanding members;
suspension means having an extremity extending from at least one of the upstanding members and coupled to the strap for suspending the strap over the support base, the extremity of the suspension means being movable relative to the said one of the upstanding members for downward travel with the strap toward the support base; and
tension means mounted on the frame and operative upon the strap to oppose the suspension means for urging the strap toward the support base.

2. The cargo rack according to claim 1 which further comprises partition means for engaging the strap with the base and defining a plurality of payload bay sections.

3. The cargo rack according to claim 2 wherein the partition means include a pin securable to the support base between the upstanding members.

4. The cargo rack according to claim 1 wherein the support base is an elongated member having a channel shape cross section.

5. The cargo rack according to claim 4 wherein the tension means is affixed to one end of the elongated member.

6. The cargo rack according to claim 5 wherein the tension means includes a ratchet mechanism.

7. The cargo rack according to claim 1 wherein the upstanding members are hingedly mounted to the support base.

8. The cargo rack according to claim 1 which further comprises mounting means for securing the frame to the vehicle.

9. The cargo rack according to claim 8 wherein the mounting means includes a base support member and a roof mounting member pivotally connected together.

10. The cargo rack according to claim 8 wherein the vehicle includes a gutter, and wherein the mounting means includes a gutter bracket adapted to mount the cargo rack to the gutter of the vehicle, the bracket including a base support leg and a retaining leg disposed on opposite sides of the gutter; and a mounting bolt interengaging the base support leg and retaining leg with the support base and urging the base support legs and the retaining leg against the gutter.

11. A cargo rack adapted to be mounted on a vehicle for carrying a cargo, the cargo rack comprising:
a frame having a support base and a pair of spaced apart upstanding members mounted on the support base;
a strap secured to the frame and extending between the upstanding members;
suspension means extending from at least one of the upstanding members and coupled to the strap for suspending the strap over the support base the suspension means including an elastic cord; and
tension means mounted on the frame and operative upon the strap to oppose the suspension means from urging the strap toward the support base.

12. The cargo rack according to claim 11 wherein a pair of elastic cords are provided, extending from each of the upstanding members, respectively.

13. A cargo rack adapted to be mounted on a vehicle for carrying a cargo, the cargo rack comprising:
a frame having a support base and a pair of spaced apart upstanding members mounted on the support base;
a strap secured to the frame and extending between the upstanding members;
suspension means extending from at least one of the upstanding members and coupled to the strap for suspending the strap over the support base;
tension means mounted on the frame and operative upon the strap to oppose the suspension means for urging the strap toward the support base; and
take-up means for receiving a portion of the strap into the support base.

14. The cargo rack according to claim 13 wherein the take-up means includes an elastic cord connecting the strap to the frame.

15. A cargo rack adaptable to be mounted on a vehicle for carrying a cargo, the rack comprising:
a frame having a support base adapted for supporting a cargo; and
a plurality of pairs of spaced apart upstanding members mounted on the support base, each pair of the upstanding members having a strap secured to the support base, the strap including a strap portion extending above the support base and between the upstanding members; suspension means having an extremity extending from at least one of the upstanding members for engaging and suspending the strap portion, the extremity of the suspension means being movable relative to the said one of the upstanding members for downward travel with the strap toward the support base, and tension means mounted on the frame for engaging the strap and to urge the strap to move toward the cargo.

16. The cargo rack according to claim 15 wherein the pairs of upstanding members are positioned adjacent each other in transverse relationship on the vehicle.

17. The cargo rack according to claim 15 wherein the pairs of upstanding members are positioned in a spaced apart, fore-and-aft relationship on the vehicle.

18. A cargo rack adapted to be mounted on a vehicle for carrying a cargo, the cargo rack comprising:
   a frame having a support base for supporting the cargo, and further having a pair of upstanding members mounted on the support base;
   a strap secured to the support base and including a strap portion extending over the support base;
   suspension means having an extremity coupled to the strap and biasing the strap portion to a position above the support base to define a payload bay, the extremity of the suspension means being movable relative to the upstanding members for downward travel with the strap toward the support base; and
   tension means mounted on the support base for overcoming the bias of the suspension means for urging the strap portion toward the support base and against the cargo to hold the cargo in position upon the support base.

19. A cargo rack adapted to be mounted on a vehicle for carrying a cargo, the cargo rack comprising:
   a support base for supporting the cargo;
   a strap secured to the support base and including a strap portion extending over the support base;
   suspension means coupled to the strap and biasing the strap portion to a position above the support base to define a payload bay, the suspension means including a pair of spaced apart upstanding members mounted on the base and an elastic cord extending from at least one of the upstanding members; and
   tension means mounted on the support base for overcoming the bias of the suspension means for urging the strap portion toward the support base and against the cargo to hold the cargo in position upon the support base.

* * * * *